US008948096B2

(12) United States Patent
Tanaka

(10) Patent No.: US 8,948,096 B2
(45) Date of Patent: Feb. 3, 2015

(54) TRANSMISSION METHOD, RADIO BASE STATION AND MOBILE STATION

(75) Inventor: Yoshinori Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 351 days.

(21) Appl. No.: 12/765,644

(22) Filed: Apr. 22, 2010

(65) Prior Publication Data

US 2010/0254338 A1   Oct. 7, 2010

Related U.S. Application Data

(63) Continuation of application No. PCT/JP2007/070804, filed on Oct. 25, 2007.

(51) Int. Cl.
*H04W 28/16* (2009.01)
*H04W 48/12* (2009.01)
*H04W 56/00* (2009.01)
*H04J 11/00* (2006.01)
*H04J 13/00* (2011.01)
(Continued)

(52) U.S. Cl.
CPC .......... *H04W 48/12* (2013.01); *H04W 56/0015* (2013.01); *H04J 11/0069* (2013.01); *H04J 13/0003* (2013.01); *H04J 13/0062* (2013.01); *H04W 8/005* (2013.01); *H04W 28/16* (2013.01); *H04W 84/045* (2013.01); *H04W 88/08* (2013.01)
USPC ........................................................ 370/329

(58) Field of Classification Search
USPC ......... 370/329–330, 341, 431, 436, 437–439, 370/458, 498, 503, 507, 509, 510–514, 520
See application file for complete search history.

(56) References Cited

U.S. PATENT DOCUMENTS 5,920,819 A    7/1999  Asanuma
7,145,890 B1 * 12/2006  Seo et al. ...................... 370/331
(Continued)

FOREIGN PATENT DOCUMENTS

CN      1322419        11/2001
CN      1496160 A       5/2004
(Continued)

OTHER PUBLICATIONS

"Physical Channel Concept for Scalable Bandwidth in Evolved UTRA Downlink", 3GPP TSG RAN WG1 Ad Hoc on LTE; R1-050592; Sophia Antipolis, France, Jun. 20-21, 2005; pp. 1-14.
(Continued)

*Primary Examiner* — Kwang B Yao
*Assistant Examiner* — Omeed D Rahgozar
(74) *Attorney, Agent, or Firm* — Smith, Gambrell & Russell, LLP

(57) ABSTRACT

In a transmission method, a service area covered by a first cell is provided with a plurality of second cells with a smaller radius than the first cell. A first radio base station belongs to a first cell while the second radio base stations belong to different second cells. A transmitter of the first radio base station transmits a synchronization channel in a given band while a transmitter of each second radio base station transmits a synchronization channel in a band that is different from the given band and also from those of other second radio base stations. A control unit of a mobile station narrows down bands to be observed for detecting synchronization channels to the given band or, if there are some of the second cells that the mobile stations are allowed to access, to the given band and the bands corresponding to the accessible second cells.

6 Claims, 11 Drawing Sheets

(51) Int. Cl.
  *H04W 8/00* (2009.01)
  *H04W 84/04* (2009.01)
  *H04W 88/08* (2009.01)

(56) References Cited

U.S. PATENT DOCUMENTS

| | | | |
|---|---|---|---|
| 2005/0281231 | A1 | 12/2005 | Kwon et al. |
| 2007/0217440 | A1* | 9/2007 | Cho et al. .................. 370/431 |
| 2008/0186904 | A1 | 8/2008 | Koyama et al. |
| 2009/0046701 | A1 | 2/2009 | Nishio et al. |
| 2009/0092122 | A1* | 4/2009 | Czaja et al. ................ 370/350 |
| 2009/0135802 | A1 | 5/2009 | Haga et al. |
| 2010/0215077 | A1* | 8/2010 | Balakrishnan et al. ....... 375/140 |
| 2011/0085514 | A1 | 4/2011 | Higuchi et al. |
| 2011/0216844 | A1 | 9/2011 | Higuchi et al. |
| 2012/0250787 | A1* | 10/2012 | Ma et al. .................... 375/295 |

FOREIGN PATENT DOCUMENTS

| | | |
|---|---|---|
| CN | 1996791 A | 7/2007 |
| JP | 2004207983 | 7/2004 |
| JP | 2006352381 A | 12/2006 |
| JP | 2007194868 A | 8/2007 |
| JP | 2007208600 | 8/2007 |
| JP | 2007208600 A2 | 8/2007 |
| JP | 2007221743 | 8/2007 |
| WO | 2004008794 A2 | 1/2004 |
| WO | 2005062798 A2 | 7/2005 |
| WO | 2006093008 A1 | 9/2006 |
| WO | 2006134829 A1 | 12/2006 |
| WO | 2007023810 A1 | 3/2007 |
| WO | 2007080976 A1 | 7/2007 |

OTHER PUBLICATIONS

Japanese Office Action dated Sep. 13, 2011 for application No. 2009-537862.
Japanese Office Action dated May 24, 2011 for application No. 2009-537862.
3GPP TS 36.300 V8.1.0 (Jun. 2007) 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8).
3GPP TS 36.211 V2.0.0 (Sep. 2007) 3rd Generation Partnership Project; Technical Specification Group Radio Access Network; Evolved Universal Terrestrial Radio Access (E-UTRA); Physical Channels and Modulation (Release 8).
3rd Generation Partnership Project, "Spectrum Arrangement to enable Co-channel deployment of Home NodeBs", 3GPP TSG-RAN WG4 Meeting #44 R4-071494, Aug. 2007.
3rd Generation Partnership Project, "Measurement of home & private eNBs", 3GPP TSG-RAN2 WG2 Meeting #59 R2-073307, Aug. 2007.
Chinese Office Action issued Oct. 8, 2012 in the corresponding Chinese Patent Application No. 200780102016.1.
Korean Notice of Preliminary Rejection dated Jan. 16, 2012 issued in application No. 10-2011-7027395.
Partial translation of Japanese Patent Office Action issued on Aug. 28, 2012 for Japanese Patent Application No. 2011-162616.
SHRCWC, RITT, Multi-cell interference mitigation on the Cell Search in E-UTRA, R1-060962 3GPP TSG RAN WG1 meeting#44-bis Athens, GR, Mar. 27-31, 2006.
SHRCWC, RITT, Consideration on Multi-cell Interference for SCH Design in Cell Search and TP, R1-061140 3GPP TSG RAN WG1 meeting#45 Shanghai, China, May 8-12, 2006.
Freescale Semiconductor, E-UTRA Initial Cell-Search: Performance of Blind Cell-ID Detection with Cell Common PSC Vs Coherent Cell-ID Detection with Sector Specific PSC R1-062181 3GPP TSG-RAN1 #46 Tallinn, Estonia Aug. 28-Sep. 1, 2006.
Freescale Semiconductor, A Scheme for Coherent Cell Search, R1-063489 3GPP TSG-RAN1 #47 Riga, Latvia Nov. 6-10, 2006.
Extended European Search Report dated Apr. 25, 2013 for corresponding Application No. 07830538.0-1857.
Nortel Spectrum Arrangement to enable Co-channel deployment of Home NodeBs Partnership Project 3GPP TSG-RAN WG4 Meeting #44 ; Athens, Greece Aug. 20-24, 2007 R4-0701494.
Samsung Consideration for Co-channel Interference Mitigation between Home Node B and Macro Cell 3GPP TSG RAN WG4 meeting #44bis Shanghai, China , Oct. 8-12, 2007 R4-071529.
2nd Notification Chinese Office Action issued Aug. 2, 2013 in corresponding Chinese Application No. 200780102016.1.
Chinese Office Action dated Oct. 14, 2014 for corresponding Chinese Application No. 200780102016.1.

* cited by examiner

TRANSMISSION METHOD, RADIO BASE STATION AND MOBILE STATION

This application is a continuing application, filed under 35 U.S.C. §111(a), of International Application PCT/JP2007/070804, filed Oct. 25, 2007.

FIELD

An embodiment discussed herein is related to a transmission method, radio base station and mobile station.

BACKGROUND

At present, mobile communication systems such as cellular telephone systems and wireless LANs (Local Area Network) are widely deployed. Mostly, cellular-type mobile communication systems are employed. In a cellular type, which is one of the communication forms, a plurality of base stations that serve a set of cells forming a service area are installed, and communications are controlled by these base stations cooperating with each other. A mobile station accesses a cell with good communication quality out of cells that are accessible from where it is now, and performs radio communication.

In order to select an optimal cell, the mobile station performs a cell search. In the cell search, the mobile station establishes synchronization with each radio signal from base stations, and obtains information required for selecting a cell. A base station continuously transmits a signal on a synchronization channel (SCH) in a given frequency band. For use on a synchronization channel, a scrambling sequence is previously assigned to each cell. The mobile station detects a correlation between a signal on a synchronization channel received from a base station and each candidate of scrambling sequence, to thereby specify a scrambling sequence used in the cell to which the mobile station currently belongs. Through this process, the mobile station recognizes the cell to which it currently belongs, and detects the timing of receiving radio signals. In this connection, at least different scrambling sequences are assigned to adjacent cells. Therefore, even when the mobile station belongs to a plurality of cells, it can distinguish and recognize them (for example, refer to the following two literatures). It is noted that, in general, the band for a synchronization channel is set in the center of a transmission band.

3rd Generation Partnership Project, "Evolved Universal Terrestrial Radio Access (E-UTRA) and Evolved Universal Terrestrial Radio Access Network (E-UTRAN); Overall description; Stage 2 (Release 8)", 3GPP TS36.300, 2007-06, V8.1.0

3rd Generation Partnership Project, "Evolved Universal Terrestrial Radio Access (E-UTRA); Physical Channels and Modulation (Release 8)", 3GPP TS36.211, 2007-09, V2.0.0.

By the way, in the conventional radio communication systems, macrocells with a radius of 1 to several km are mainly provided. On the other hand, the recent trend is to provide many cells with a small radius for supporting macrocells in order to realize high-rate and stable data communication. Especially, a cell with as small a radius as several m is called a femtocell. By introducing such a femtocell in a house or office, a mobile station in such a place may access the femtocell, which reduces the need of accessing the macrocells. This leads to a reduction in loads imposed on the base stations serving the macrocells, and a further improvement in communication quality.

To provide a femtocell over a macrocell, there is a method of setting an offset to the transmission band of the femtocell so as to separate the transmission band of the macrocell and the transmission band of the femtocell in the macrocell (for example, refer to 3rd Generation Partnership Project, "Measurement of home & private eNBs", 3GPP TSG-RAN WG2 Meeting #59 R2-073307, 2007-08). In addition, there is another method of allocating a femtocell a narrower bandwidth than a macrocell in order to reduce interference between them (for example, refer to 3rd Generation Partnership Project, "Spectrum Arrangement to enable Co-channel deployment of Home NodeBs", 3GPP TSG-RAN WG4 Meeting ##44 R4-071494, 2007-08).

It is expected that a plurality of relatively small cells, like femtocells, will be provided in a large cell.

In doing so, if a large cell and small cells are allocated a completely same transmission band (transmission frequency band) for synchronization channels, a mobile station takes a time to determine a desired cell. This is a problem.

Then consider providing femtocells that are not open to use by all mobile stations but are accessible from only admitted mobile stations, for example. Though these admitted mobile stations may attempt to search a desired femtocell as fast as possible, the use of the same transmission band for synchronization channels in common among the femtocells and the large cell causes the mobile stations to individually receive synchronization channels that are transmitted in the same band, individually establish synchronization to obtain information such as broadcast information, and then determine whether a cell being searched is a desired femtocell (or whether the mobile station has access rights to the cell). Therefore, it also takes a time.

In short, it requires a considerable time to determine a desired cell in an environment where the large cell and the plurality of small cells coexist.

SUMMARY OF THE INVENTION

According to one aspect of the invention, provided is a transmission method of transmitting a synchronization channel in a radio communication system where a plurality of second cells with a smaller radius than a first cell are provided in a service area covered by the first cell where a first synchronization channel is transmitted in a given partial band of a first transmission band, and each of the plurality of second cells is allocated a second transmission band that at least partly overlaps with the first transmission band of the first cell. In this transmission method, in each second cell, a second synchronization channel is transmitted in a partial band of the second transmission band, in which the partial band is different from the given partial band and is different depending on a group of the second cell.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWING(S)

DESCRIPTION OF EMBODIMENT(S)

Hereinafter, an embodiment of the present invention will be described in detail with reference to the accompanying drawings. The description begins with an overview of an embodiment to be discussed herein and then proceeds to the details of those embodiments.

Figure 1:
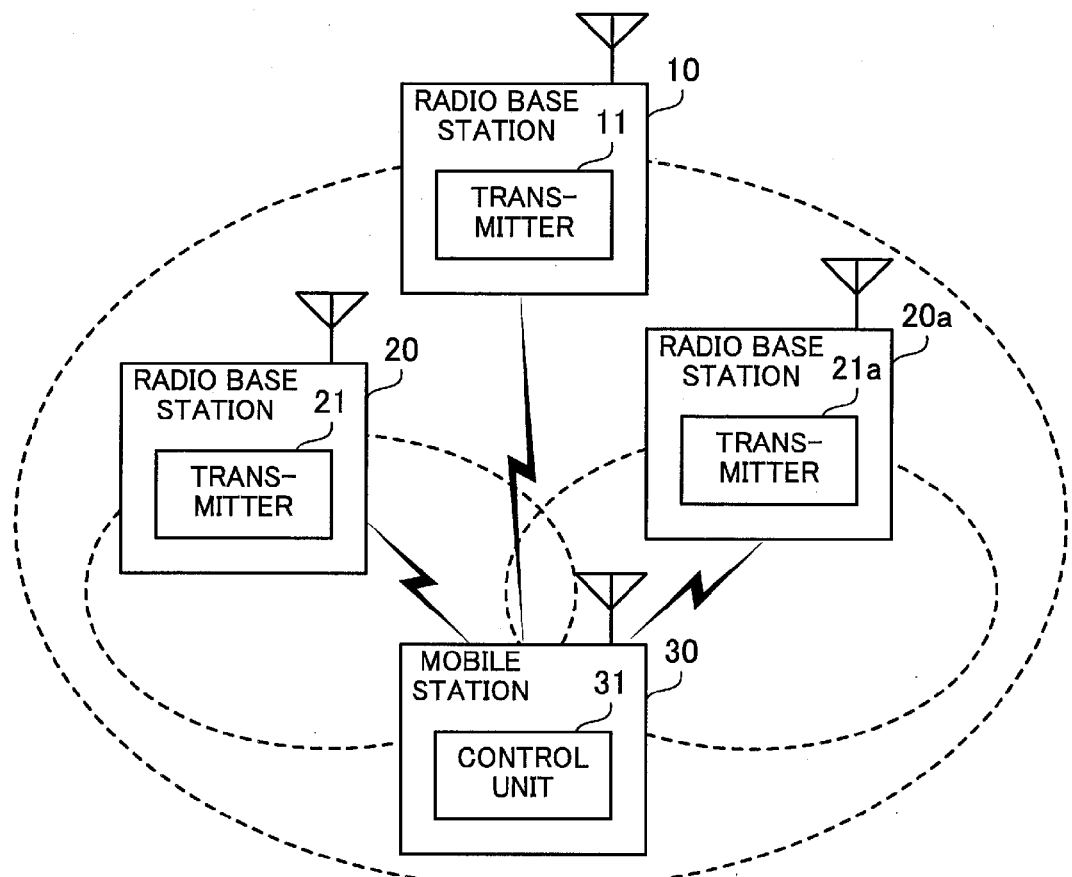
FIG. 1 illustrates an overview of an embodiment.
Figure 1:
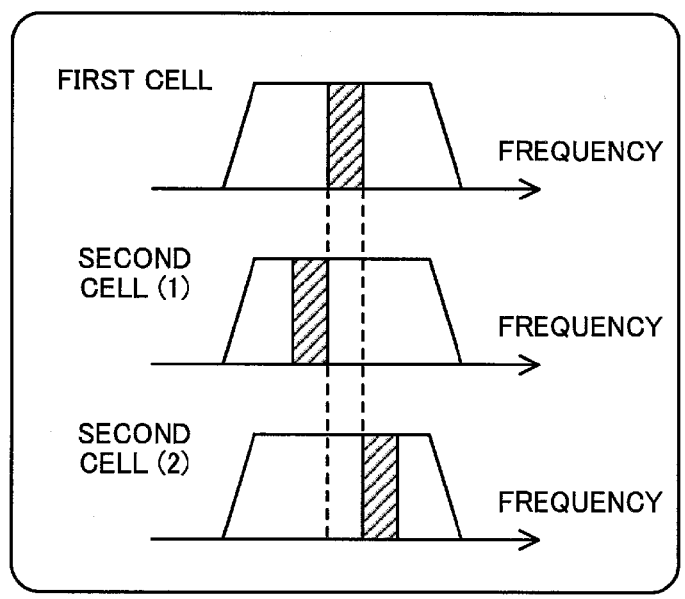

FIG. 1 illustrates an overview of an embodiment. In a radio communication system of FIG. 1, a plurality of cells are provided in a service area, and a mobile station selects a cell from among this plurality of cells to access in order to perform radio communication. This communication system includes radio base stations 10, 20, and 20a, and a mobile station 30.

The radio base station 10 is a radio base station that serves a first cell with a large radius. That is, the first cell is a radio coverage area of the radio base station 10. The first cell is equivalent to a macrocell with a radius of 1 to several km. The radio base station 10 is capable of performing radio communication with mobile stations existing in its cell.

The radio base station 10 includes a transmitter 11. The transmitter 11 transmits radio signals to mobile stations existing in the cell of the radio base station 10. At this time, the transmitter 11 continuously transmits a signal on a synchronization channel in a part of its utilizable downlink transmission band. For example, a central band of the transmission band of the first cell is used for the synchronization channel.

Each radio base station 20, 20a is a radio base station that serves a second cell with a smaller radius than the first cell. That is, the second cell is the radio coverage area of the radio base station 20, 20a. Second cells are provided in the service area covered by the first cell in such a manner as to overlap with the first cell. The second cell is equivalent to a femtocell with a radius of several m, for example. The radio base station 20, 20a is capable of performing radio communication with mobile stations existing in its cell.

The radio base station 20 includes a transmitter 21. The transmitter 21 transmits radio signals to mobile stations existing in the cell of the radio base station 20. At this time, the transmitter 21 continuously transmits a signal on a synchronization channel in a part of its utilizable downlink transmission band. Similarly, the radio base station 20a includes a transmitter 21a that has similar functions to the transmitter 21 of the radio base station 20.

In this embodiment, the transmission band for the first cell at least partly overlaps with that for each second cell. Different bands are used for the synchronization channel of each second cell and that of the first cell. In addition, different bands are used for the synchronization channels of the second cells depending on the groups of the second cells. That is to say, if the radio base stations 20 and 20a have their cells belonging to different groups, the radio base stations 20 and 20a use different bands for the synchronization channels in their cells.

The mobile station 30 is a radio terminal device that is capable of performing communication with another mobile station or a computer via a radio base station. The mobile station 30 is permitted to access the first cell, as well as at least some of a plurality of second cells. In other words, the mobile station 30 is not always permitted to access all of the second cells. The mobile station 30 has information indicating accessible second cells. The mobile station 30 also has information indicating correspondences between the groups of second cells and bands used for synchronization channels. In addition, the mobile station 30 performs a cell search when powered on, and where appropriate during radio communication and standby periods.

The mobile station 30 includes a control unit 31. The control unit 31 controls bands to be observed for detecting synchronization channels in the cell search. Specifically, the control unit 31 narrows down the bands to be observed in the cell search to the band for the synchronization channel of the first cell or to the band for the synchronization channel of the first cell and the bands for the synchronization channels corresponding to the groups of the accessible second cells. That is, the control unit 31 excludes the bands for the synchronization channels corresponding to the groups of inaccessible second cells, from cell search targets.

The above "different" bands used for synchronization channels refer to bands that do not completely match. That is to say, bands that partly match may also be called different bands. This is because a synchronization channel transmitted in a band slightly different from bands observed in a cell search is not detected.

In such a radio communication system, in each of a plurality of second cells provided in a service area covered by a first cell, a synchronization channel is transmitted in a band that is different from that for the synchronization channel of the first cell and is also different depending on the group of the second cell. In addition, in the cell search, a mobile station narrows down bands to be observed for detecting synchronization channels to the band for the synchronization channel of the first cell or to the band for the synchronization channel of the first cell and the bands for the synchronization channels of accessible second cells.

Accordingly, the radio communication system can avoid unnecessary detection of the synchronization channels of inaccessible cells in the cell search, which can realize a more efficient and faster cell search and also reduce power consumption of the mobile station.

The specific embodiment will now be described with reference to the accompanying drawings.

Figure 2:
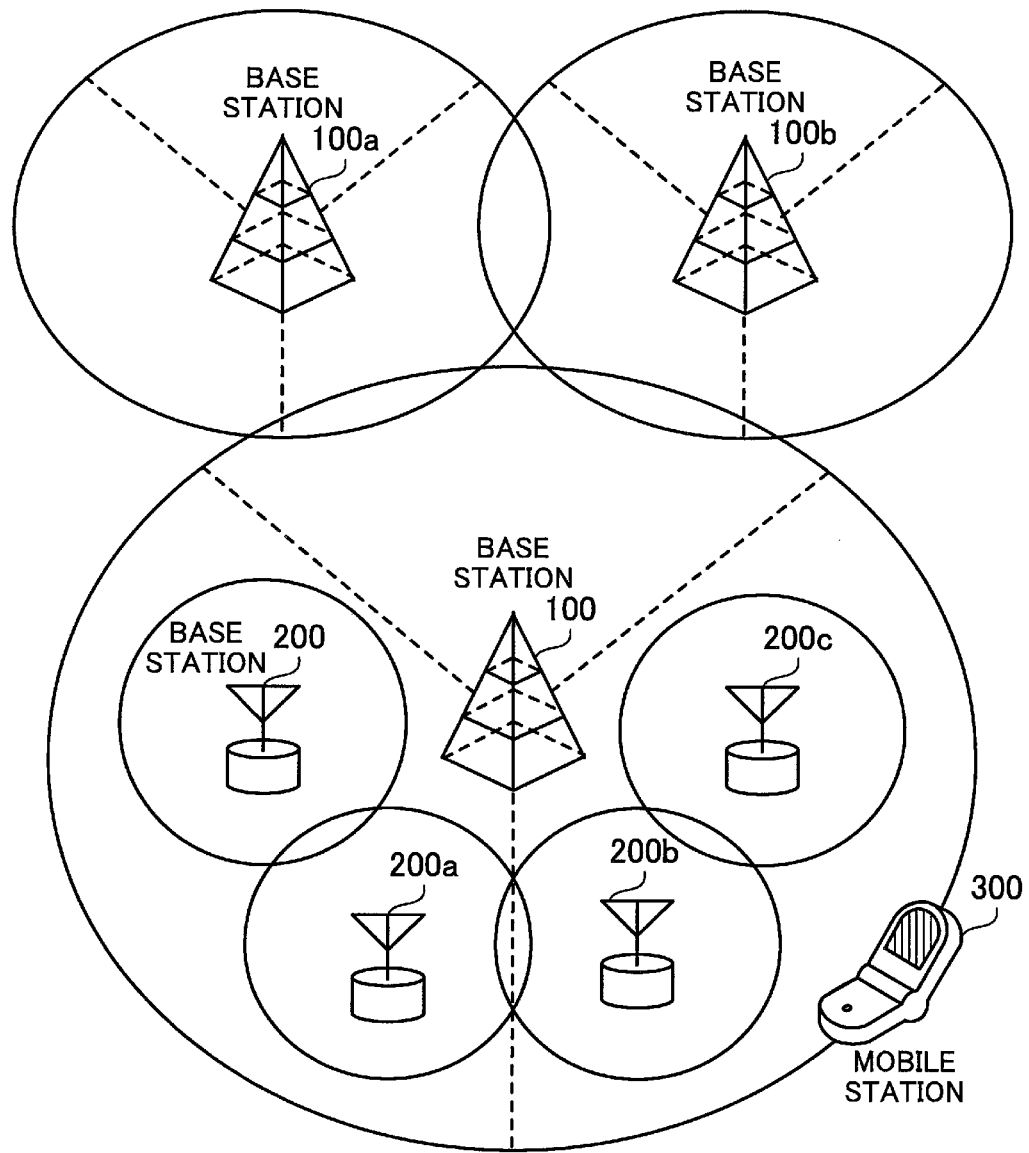
FIG. 2 illustrates a system configuration of the embodiment.

FIG. 2 illustrates a system configuration according to the embodiment. A cellular telephone system according to the embodiment includes base stations 100, 100a, 100b, 200, 200a, 200b, and 200c and a mobile station 300.

Each base station 100, 100a, 100b is a radio base station that serves a macrocell. A plurality of macrocells forms a service area of the cellular telephone system. The base station 100, 100a, 100b is capable of performing radio communication with the mobile station 300 when the mobile station 300 is in its macrocell. In addition, the base station 100, 100a, 100b continuously transmits a signal on a synchronization channel in a given downlink frequency band.

Each macrocell is divided into three sectors. Sectors are virtual cells that are realized by a directional antenna. That is, the sectors are parts of the macrocell but are individually recognized by the mobile station 300 (hereinafter, "cell"

includes sectors). Dividing one macrocell into three sectors produces similar effects to installing three base stations.

Each base station 200, 200a, 200b, 200c is a radio base station that serves a femtocell. The femtocell is provided in such a manner as to overlap with a macrocell in a service area covered by macrocells. A femtocell may be provided across a plurality of macrocells. In this embodiment, the femtocells of the base stations 200, 200a, 200b, and 200c are provided in the macrocell of the base station 100. Each base station 200, 200a, 200b, 200c is capable of performing radio communication with the mobile station 300 when the mobile station 300 exists in its femtocell.

Femtocells are grouped, so that each femtocell belongs to one group. In each femtocell, a signal on a synchronization channel is transmitted in a frequency band corresponding to its belonging femtocell group. In other words, the same band is used for the synchronization channels of femtocells belonging to the same group. In this embodiment, suppose that the femtocells of the base stations 200, 200a, 200b, and 200c belong to different groups.

The mobile station 300 is a cellular telephone that is capable of performing communication with another mobile station or a computer via a base station by accessing a cell where the mobile station 300 currently exists. The mobile station 300 receives signals on synchronization channels when powered on, and performs a cell search to select an optimal cell. In addition, in order to always use an optimal cell, the mobile station 300 performs the cell search where appropriate during radio communication and standby periods.

In this connection, the mobile station 300 is permitted to access all macrocells but not permitted to access all femtocells. That is, in the femtocell groups of the base stations 200, 200a, 200b, and 200c, some femtocells are the ones that the mobile station 300 is permitted to access, but some are not.

Each cell is previously assigned an identifier, or ID, by a system administrator. An ID to be assigned is selected from among 510 IDs. If a system has 511 or more cells, the system administrator assigns IDs so that the same ID is assigned to cells located as far as possible. An ID corresponds to a scrambling sequence that is used on a synchronization channel, so that the mobile station 300 can detect an ID assigned to a cell by specifying the type of a scrambling sequence used on the synchronization channel.

Figure 3:
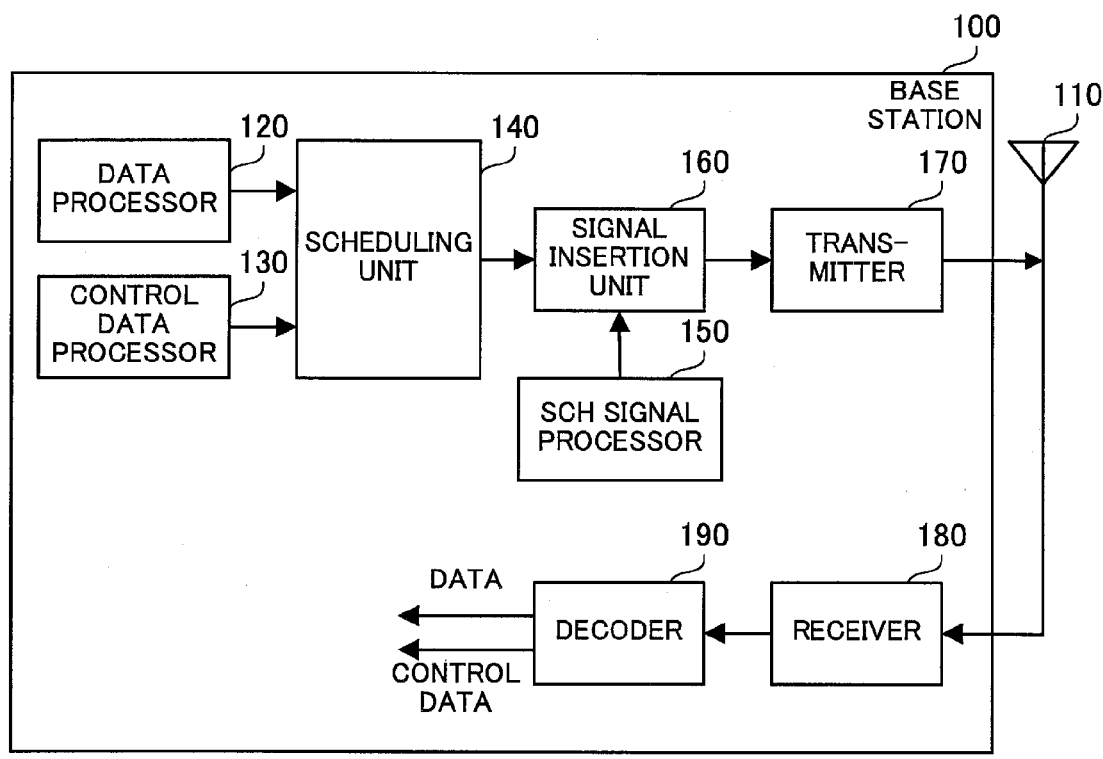
FIG. 3 is a block diagram illustrating the functions of a base station.

FIG. 3 is a block diagram illustrating the functions of a base station. The base station 100 has a transceiver antenna 110, a data processor 120, a control data processor 130, a scheduling unit 140, an SCH signal processor 150, a signal insertion unit 160, a transmitter 170, a receiver 180, and a decoder 190. In this connection, the base stations 100a, 100b, 200, 200a, 200b, and 200c may have the same module configuration as the base station 100.

The transceiver antenna 110 is an antenna for both transmission and reception. The transceiver antenna 110 transmits downlink radio signals received from the transmitter 170. The transceiver antenna 110 also receives uplink signals from the mobile station 300, and passes them to the receiver 180.

The data processor 120 encodes packet data destined for the mobile station 300, and passes the resultant to the scheduling unit 140. For example, the data processor 120 encodes and passes VoIP (Voice over Internet Protocol) data, electronic mail data, and image data, which is destined for the mobile station 300.

The control data processor 130 encodes control data destined for the mobile station 300, and passes the resultant to the scheduling unit 140. For example, the control data processor 130 encodes and passes information on an encoding method for packet data, information on downlink radio resources to be used in the transmission of packet data, or information on radio resources to be allocated to the mobile station 300.

The scheduling unit 140 manages the allocation states of downlink radio resources. Upon receipt of packet data and control data, the scheduling unit 140 determines downlink radio resources to be used for their transmissions, that is, transmission timing and transmission frequency. Then, the scheduling unit 140 sequentially passes signals of the packet data and control data to the signal insertion unit 160 according to the scheduling result. In this connection, the scheduling unit 140 reserves the downlink radio resources allocated to the synchronization channel without using them for the transmissions of the packet data and control data.

The SCH signal processor 150 produces a scrambling sequence using a parameter preset by the system administrator. The parameter set here is a value that determines the type of a scrambling sequence, and corresponds to an ID assigned to a cell. As a scrambling sequence, a pseudo-random sequence with very long repetition time is used. Specifically, the SCH signal processor 150 uses Zadoff-Chu sequence of length 63 and Maximum sequence (M-sequence) of length 31. Then, the SCH signal processor 150 gives the produced scrambling sequence to the signal insertion unit 160.

The signal insertion unit 160 inserts the scrambling sequence produced by the SCH signal processor 150 at positions corresponding to the synchronization channel in the series of signals obtained from the scheduling unit 140. Then, the signal insertion unit 160 passes the resultant signals to the transmitter 170.

The transmitter 170 modulates and multiplexes the signals of packet data and control data received from the signal insertion unit 160, and passes the resultant to the transceiver antenna 110.

Upon reception of signals transmitted from the mobile station 300 via the transceiver antenna 110, the receiver 180 demodulates the received signals. The receiver 180 then gives the demodulated signals to the decoder 190.

The decoder 190 decodes the demodulated signals received from the receiver 180, and extracts packet data and control data from the signals. Thus obtained packet data is transferred to a destination mobile station or computer. Thus obtained control data, on the other hand, is used by the base station 100 to control the radio communication with the mobile station 300.

Figure 4:
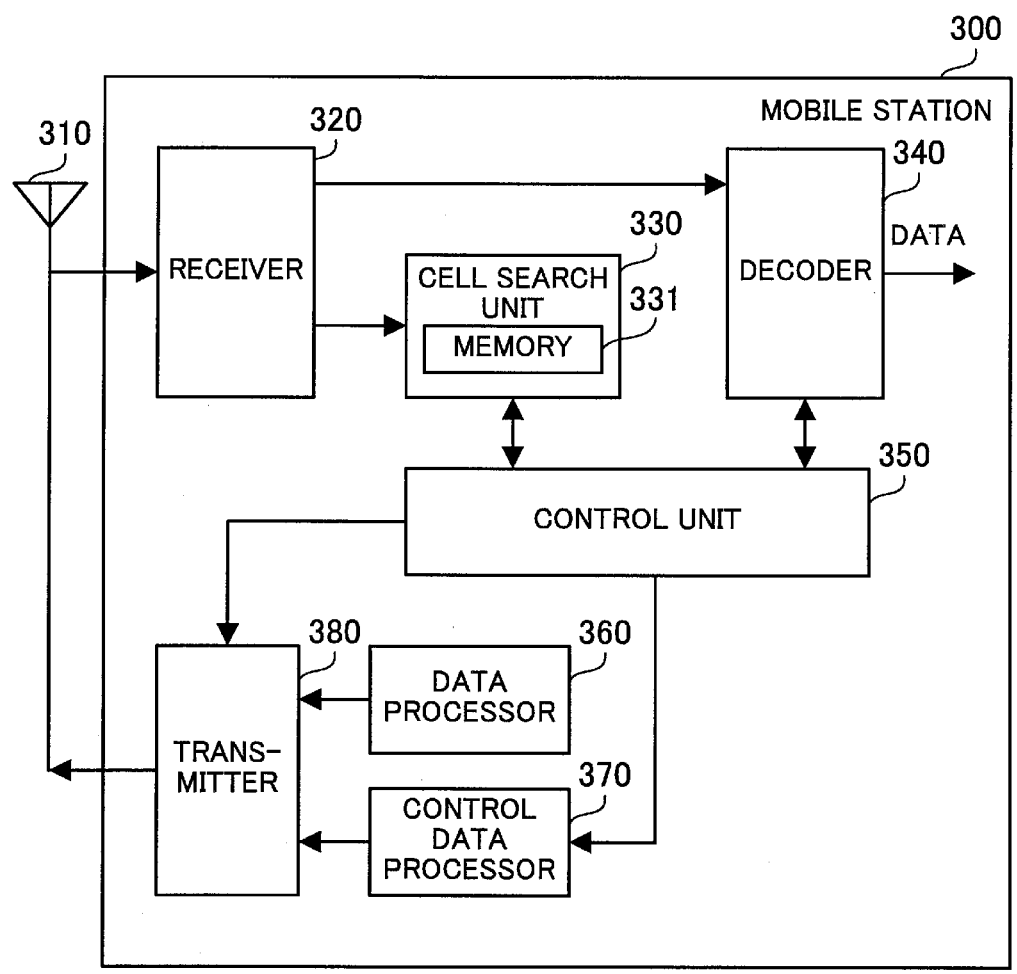
FIG. 4 is a block diagram illustrating the functions of a mobile station.

FIG. 4 is a block diagram illustrating the functions of a mobile station. The mobile station 300 has a transceiver antenna 310, a receiver 320, a cell search unit 330, a decoder 340, a control unit 350, a data processor 360, a control data processor 370, and a transmitter 380.

The transceiver antenna 310 is an antenna for both transmission and reception. The transceiver antenna 310 transmits uplink radio signals received from the transmitter 380. The transceiver antenna 310 receives downlink signals from the base stations 100, 100a, 100b, 200, 200a, 200b, and 200c, and passes them to the receiver 320.

Upon reception of signals from the transceiver antenna 310, the receiver 320 extracts and demodulates signals destined for the own station. The receiver 320 then passes the demodulated signals to the decoder 340. The receiver 320 also passes the signals to the cell search unit 330 during the cell search.

The cell search unit 330 has a memory 331. Upon reception of demodulated signals from the receiver 320, the cell search unit 330 temporarily stores them in the memory 331. Then the cell search unit 330 extracts signals of some frequency bands from the demodulated signals stored in the memory 331, and performs the cell search. The frequency bands to be observed in the cell search are specified by the control unit 350. Then, the cell search unit 330 reports the cell search result to the control unit 350.

The decoder 340 decodes the demodulated signals received from the receiver 320, and extracts packet data and control data from the signals. Information required for appropriately recognizing and decoding frames, which are transmission units of radio signals, is notified of by the control unit 350. Thus obtained packet data is taken in and processed according to its type. For example, in the case of VoIP data, voices and sounds are reproduced. In the case of electronic mail or image data, text or images are displayed on a display screen. Thus obtained control data, on the other hand, is given to the control unit 350 to be used for controlling radio communication with the base stations 100, 100*a*, 100*b*, 200, 200*a*, 200*b*, and 200*c*.

The control unit 350 stores information of correspondences between femtocell groups and frequency bands for synchronization channels. The control unit 350 also stores information on accessible femtocells, which the mobile station 300 is allowed to access. When the mobile station 300 is powered on, the control unit 350 instructs the cell search unit 300 to perform the cell search. The control unit 350 determines an optimal cell based on the cell search result, and controls transmission and reception of radio signals in the selected cell.

The control unit 350 also instructs the cell search unit 330 to perform the cell search where appropriate during radio communication and standby periods. Then, the control unit 350 passes the cells search result to the control data processor 370. During the radio communication and standby periods, this process is performed to make a base station select an optimal cell. Then, the control unit 350 controls transmission and reception of radio signals in the cell selected by the base station.

The data processor 360 encodes packet data to be wirelessly transmitted, and passes the resultant to the transmitter 380. For example, the data processor 360 generates and passes signals of VoIp data, electronic mail data, or image data according to user operation of the mobile station 300.

The control data processor 370 encodes control data to be wirelessly transmitted, and passes the resultant to the transmitter 380. For example, the control data processor 370 encodes and passes ACK/NACK, which is a response to reception of packet data, information on a quality measurement result of downlink, or information on a cell search result.

The transmitter 380 modulates and multiplexes a packet data signal from the data processor 360, a control data signal from the control data processor 370, and a given pilot signal instructed by the control unit 350. Then, the transmitter 380 passes the obtained modulated signals to the transceiver antenna 310.

Figure 5:
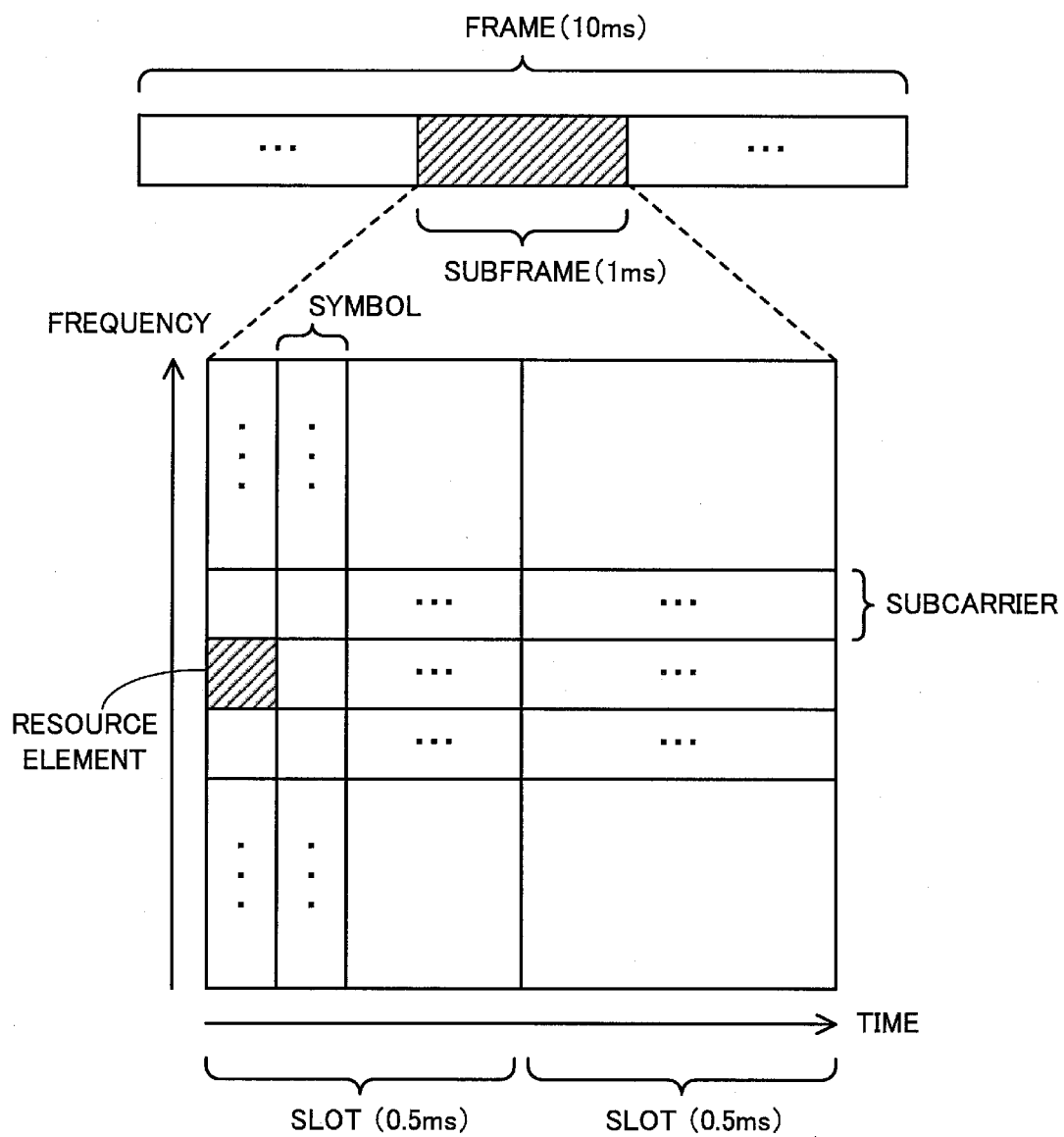
FIG. 5 illustrates a frame structure of a radio signal.

FIG. 5 illustrates a frame structure of a radio signal. FIG. 5 schematically represents the structure of a frame that is transmitted and received between a base station 100, 100*a*, 100*b*, 200, 200*a*, 200*b* 200*c* and the mobile station 300. Each frame has a time length of 10 ms, and has a plurality of subframes with a time length of 1 ms.

Each subframe is further divided in both the frequency domain and the time domain for allocation management. A minimum unit for allocation in a frequency axis is called a subcarrier, and a minimum unit for allocation in a time axis is called a symbol. A smallest unit for radio resource allocation, represented by one subcarrier and one symbol, is called a resource element. In this connection, the first and second halves of the 1-ms subframe, each of which therefore has 0.5 ms, are called slots, respectively. That is to say, one subframe has two slots. Some of such radio resources are allocated to a transmission channel for packet data, a transmission channel of control information, and a synchronization channel.

Figure 6:
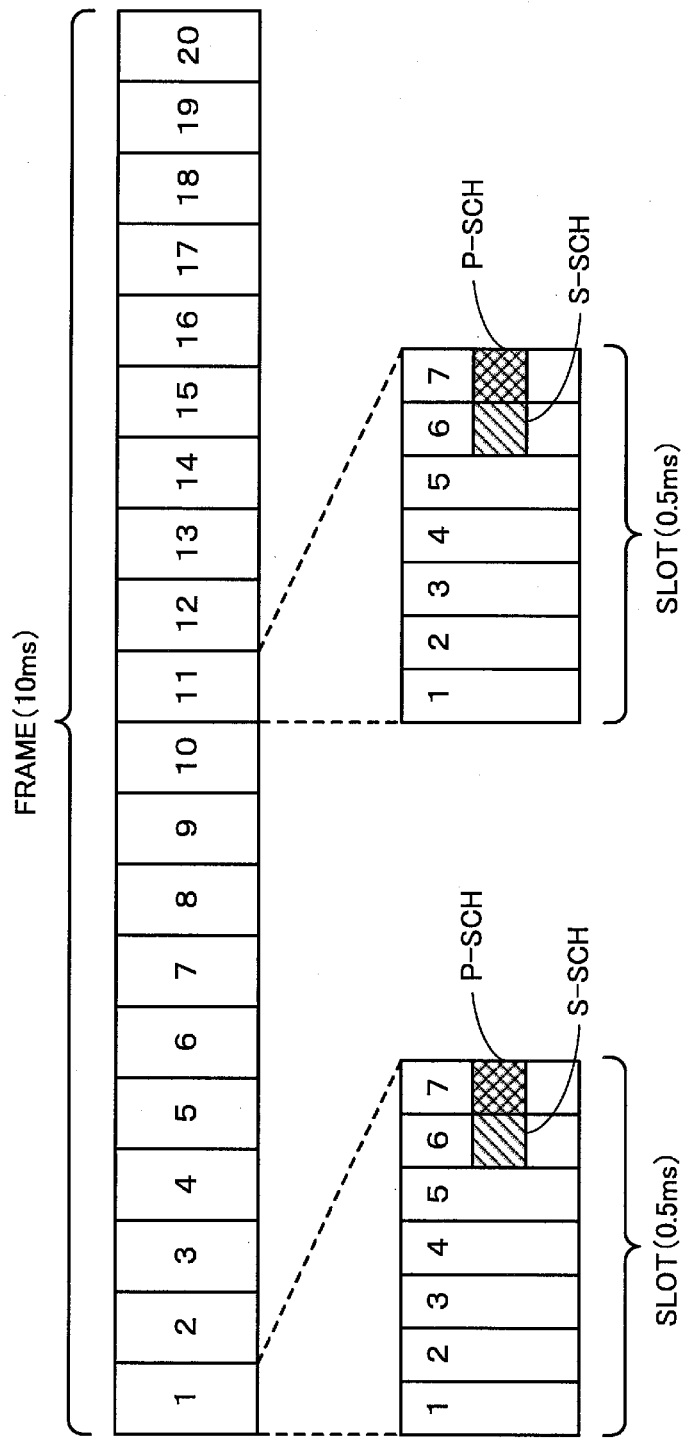
FIG. 6 illustrates radio resources to be used for a synchronization channel.

FIG. 6 illustrates radio resources to be used for a synchronization channel. As illustrated in FIG. 6, the first slot (that is, the first half slot of the first subframe) and 11th slot (that is, the first half slot of the sixth subframe) of a downlink frame are allocated to a synchronization channel.

More specifically, a primary synchronization channel (P-SCH) is allocated the last symbol of the first slot, and a secondary synchronization channel (S-SCH) is allocated the last second symbol. Similarly, P-SCH and S-SCH are allocated the last symbol and the last second symbol of the 11th slot, respectively. In these symbols, a frequency band of 1.08 MHz bandwidth preset for each cell is used.

For P-SCH, a Zadoff-Chu sequence of length 63 is used. Three types of P-SCH signal sequences are prepared. Any one of the three types of signal sequences is assigned to each cell. For S-SCH, signal sequences calculated from M-sequences of length 31 and a P-SCH signal sequence are used. More specifically, each of two signal sequences as M-sequences and a P-SCH signal sequence are multiplied, and two resultant signal sequences are alternately arranged in every other subcarrier. In this connection, the P-SCH signal sequence is multiplied in order suppress interference of a synchronization channel on adjacent cells. 170 types of S-SCH signal sequences are prepared, and any one of the 170 signal sequences is assigned to each cell.

For all synchronization channels, there are 510 combinations of signal sequences from the three types of P-SCH sequences and the 170 types of S-SCH sequences. These 510 types of signal sequences correspond to 510 IDs that are assigned to cells. As to a macrocell, one S-SCH signal sequence is assigned to the macrocell, and three types of P-SCH signals are assigned to three respective sectors of the macrocell.

The following describes a cellular telephone system configured as above and having the data structures described as above.

Figure 7:
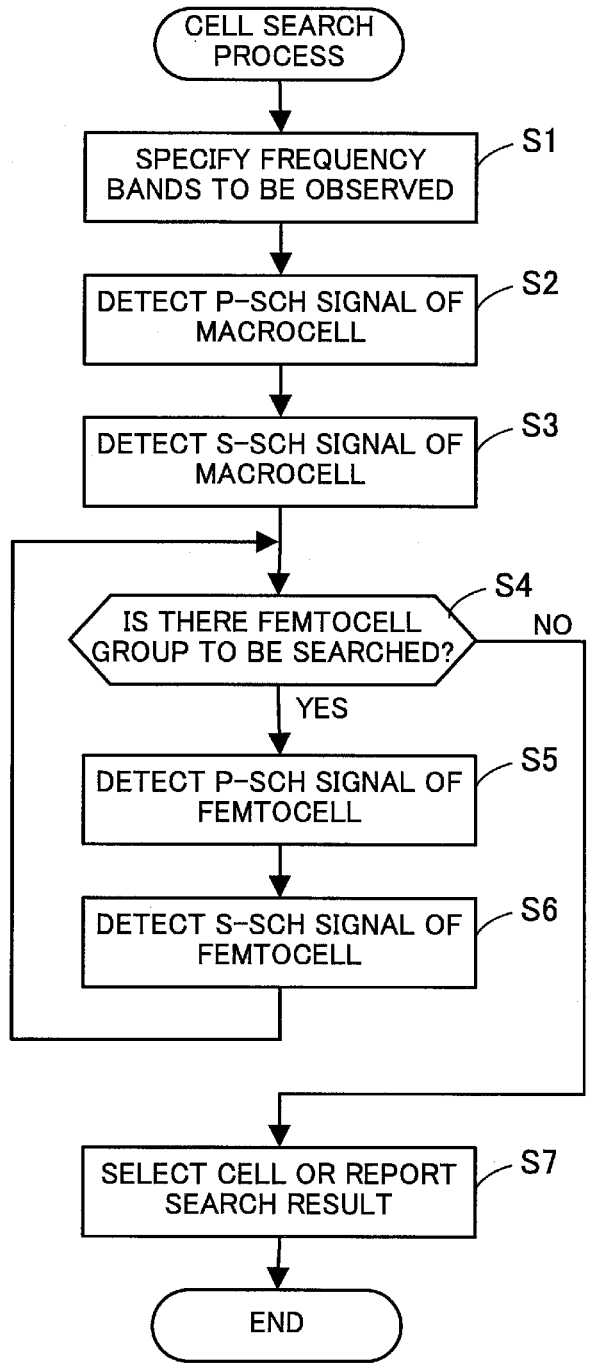
FIG. 7 is a flowchart of a cell search process.

FIG. 7 is a flowchart of a cell search process. This cell search process of FIG. 7 to be performed by the mobile station 300 will be descried step by step.

At step S1, the control unit 350 specifies frequency bands to be observed in the cell search. More specifically, the control unit 350 checks internal setting information to determine whether there are any accessible femtocells to which the mobile station 300 has access rights. If there are no such accessible femtocells, the control unit 350 specifies only the band for the synchronization channel of a macrocell. If there are some accessible femtocells, on the contrary, the control unit 350 specifies the bands for the synchronization channels of the cell groups to which the accessible femtocells belong to, as well as the band for the synchronization channel of the macrocell.

At step S2, the control unit 350 notifies the cell search unit 330 of the specified band for the synchronization channel of the macrocell. The cell search unit 330 detects a correlation between the signal of the notified band out of the received signals and each of the three types of scrambling sequences. Through this process, the cell search unit specifies the type of a P-SCH scrambling sequence assigned to the macrocell, and detects FFT (Fast Fourier Transform) window timing and symbol timing.

At step S3, the cell search unit 330 performs a FFT process on the S-SCH signal based on the symbol timing detected at step S2, to extract each subcarrier component. Through this process, the cell search unit 330 determines the type of an S-SCH scrambling sequence assigned to the macrocell, and detects frame timing. Then the cell search unit 330 reports the cell search result to the control unit 350.

At step S4, the control unit 350 determines whether the femtocell groups specified at step S1 include any femtocell groups that have not been searched yet. If there are any femtocell groups that have not been searched yet, the process proceeds to step S5. If all femtocell groups have been searched, on the contrary, the process proceeds to step S7.

At step S5, the control unit 350 selects one of the unsearched femtocell groups, and notifies the cell search unit 330 of the band for the synchronization channel corresponding to the selected femtocell group. The cell search unit 330 detects a correlation between the signal of the notified band out of the received signals and each of the three types of scrambling sequences.

At step S6, the cell search unit 330 performs a FFT process on the S-SCH signal to extract each subcarrier component. Then, the cell search unit 330 specifies the type of an S-SCH scrambling sequence assigned to the femtocell, and reports the cell search result to the control unit 350. Then, the process proceeds to step S4.

At step S7, the control unit 350 selects an optimal cell based on the cell search results if the cell search of this time is an initial cell search, which is performed when power is turned on. If the cell search is not an initial cell search, the control unit 350 includes and transmits the search result in an uplink transmit signal.

As described above, the mobile station 300 specifies a frequency band for the synchronization channel of a macrocell to perform the cell search, and then specifies frequency bands for the synchronization channels corresponding to the femtocell groups of accessible femtocells, which the mobile station 300 is permitted to access, and then performs the cell search. If this search is an initial cell search, the mobile station 30 selects a cell to access on the basis of the cell search result. If the search is not an initial cell search, on the contrary, the mobile station 300 transmits the cell search result as an uplink radio signal. This can avoid unnecessary detection of inaccessible femtocells.

In this connection, in order to specify femtocell groups from accessible femtocells to which the mobile station 300 has access rights at step S1, some methods are considered. For example, one is that IDs are assigned to respective femtocell groups, separately from IDs given to cells, and managed. Another is that femtocells are grouped according to given bits (for example, higher N bits) of IDs given to cells, thereby making it possible to specify femtocell groups based on such IDs. In addition, in the above-described embodiment, at first the cell search is performed on a macrocell. Alternatively, the cell search may be performed on accessible femtocells first.

The following describes an example of allocation of frequency bands to a macrocell and femtocell groups. Here, suppose that the mobile station 300 receives radio signals in one macrocell and four femtocells belonging to different groups.

Figure 8:
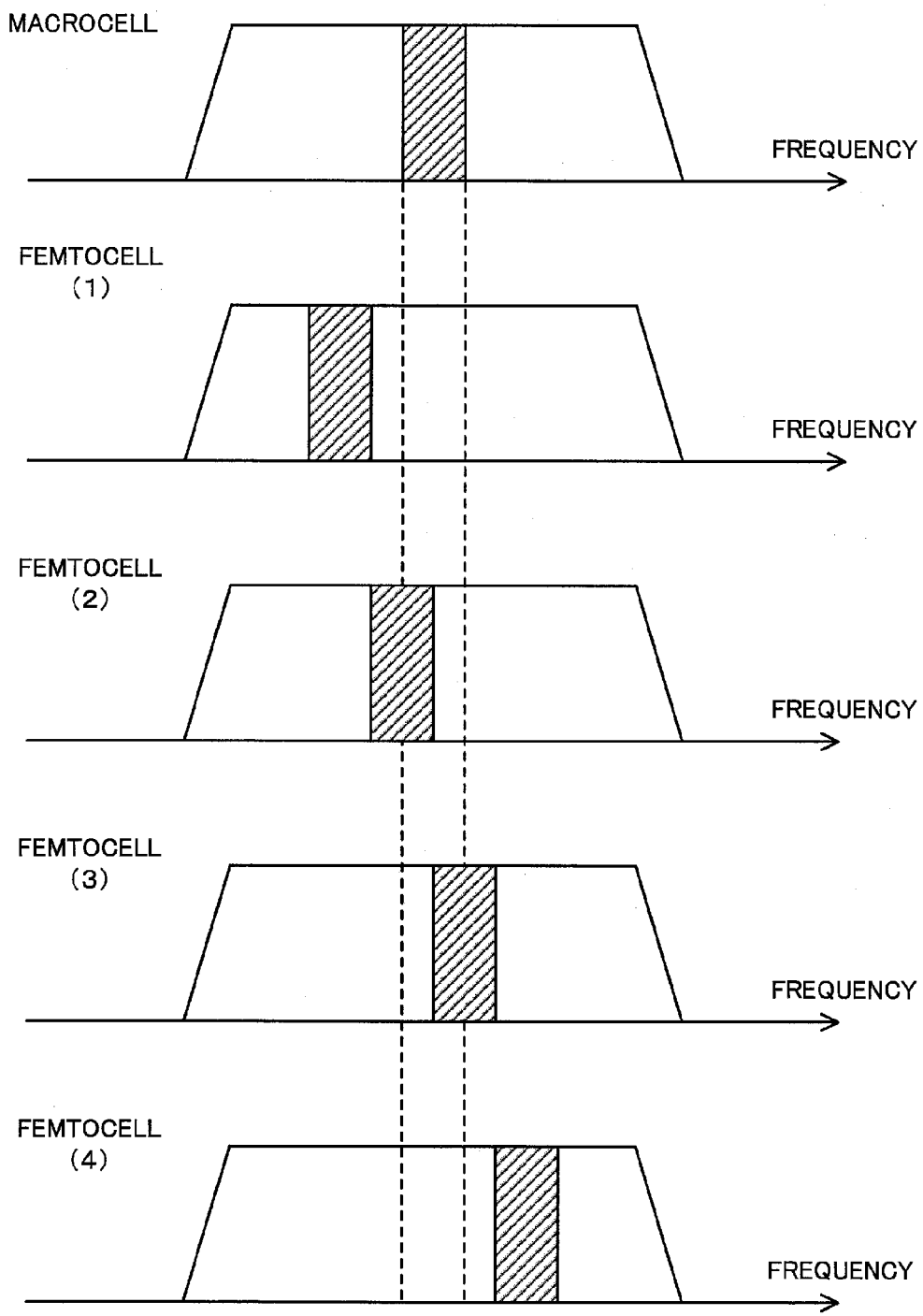
FIG. 8 is a first view illustrating a relationship between synchronization channel and frequency.

FIG. 8 is a first view illustrating a relationship between synchronization channel and frequency. In this allocation example of FIG. 8, the same transmission band is allocated to a macrocell and four femtocell groups for a synchronization channel and the other channels. The synchronization channel of the macrocell is allocated the center of the transmission band. On the other hand, the synchronization channel of each femtocell group is allocated a band that is different from that for the synchronization channel of the macrocell and does not overlap with those for the synchronization channels of the other femtocell groups.

By allocating different bands for the synchronization channels of the macrocell and femtocell groups in this way, it becomes possible to narrow down cells to be observed in the cell search in advance. In addition, by allocating the same transmission band to all cells, it becomes possible to receive signals in the entire transmission band, store them in a memory, and then extract a signal of each frequency band to perform the cell search. In this connection, the band for the synchronization channel of each femtocell group may be defined as an absolute value or as a difference from the band for the synchronization channel of the macrocell.

Figure 9:
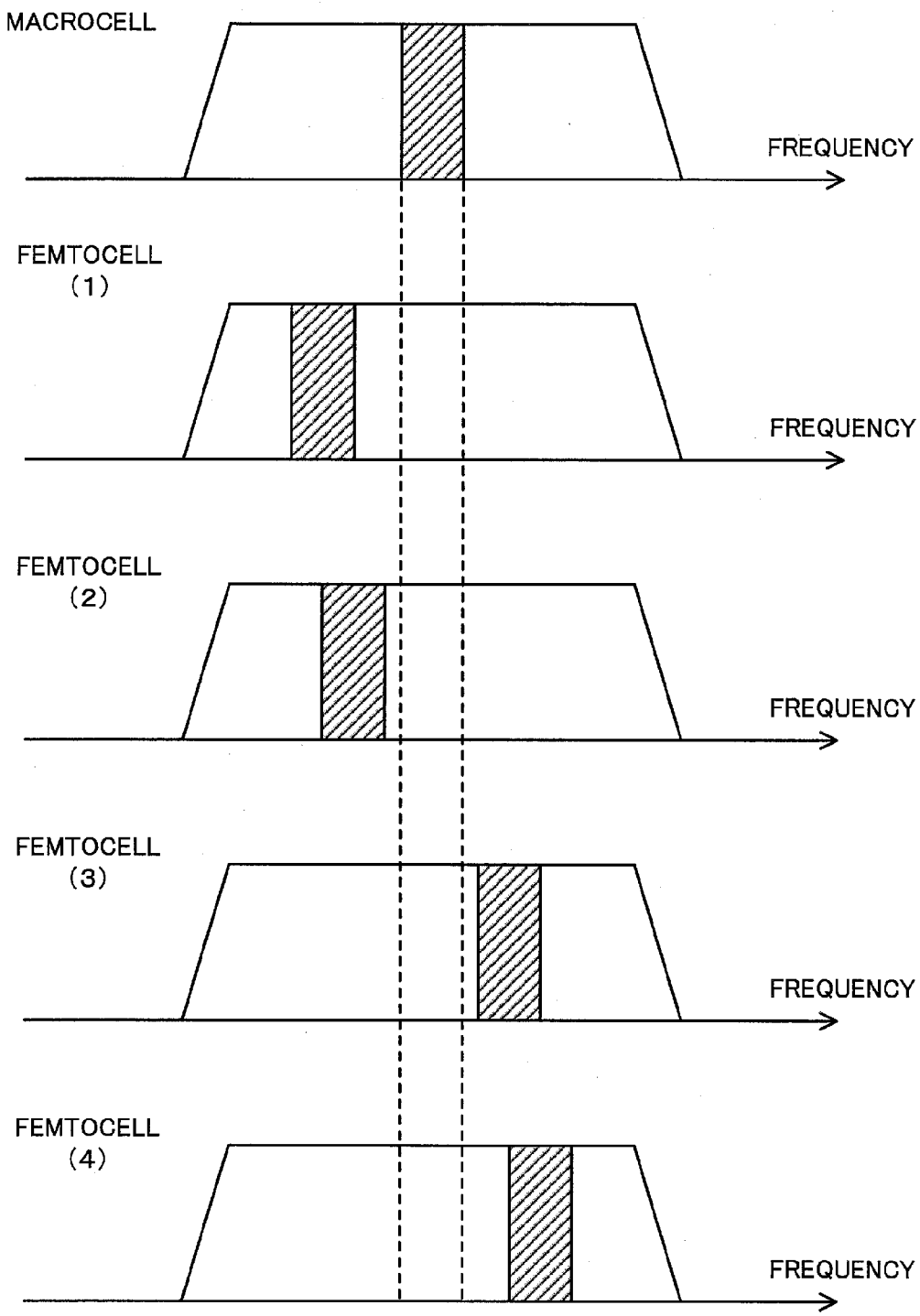
FIG. 9 is a second view illustrating a relationship between synchronization channel and frequency.

FIG. 9 is a second view illustrating a relationship between synchronization channel and frequency. Similarly to the allocation example of FIG. 8, this allocation example of FIG. 9 illustrates a situation where the same transmission band is allocated to a macrocell and four femtocell groups, and the synchronization channel of the macrocell is allocated the center of the transmission band.

What is different is that the synchronization channel of each femtocell group is allocated a band completely off the band for the synchronization channel of the macrocell. This results in a reduction of interference on signals of the macrocell that is often subjected to a cell search. In addition, the bands for the synchronization channels of femtocell groups partly overlap. This is because, in the cell search, a synchronization channel, having a difference by only one subcarrier from bands to be observed, is not detected. Therefore, partly overlapping bands may be allocated to synchronization channels.

Figure 10:
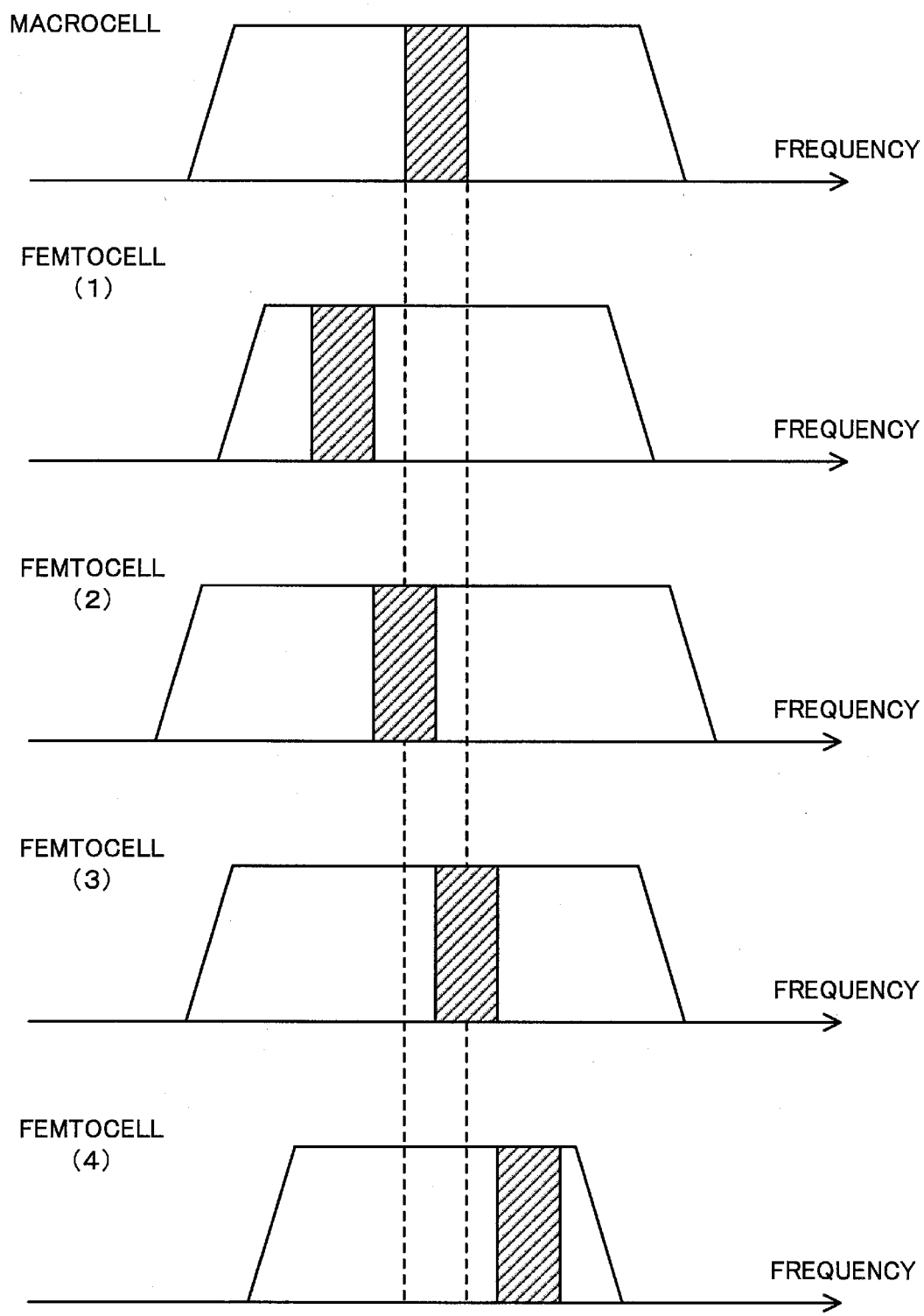
FIG. 10 is a third view illustrating a relationship between synchronization channel and frequency.

FIG. 10 is a third view illustrating a relationship between synchronization channel and frequency. In this allocation example of FIG. 10, the synchronization channels are allocated frequency bands in the same way as the allocation example of FIG. 8. What is different is that the cells have transmission bands with different bandwidths. It is noted that it is not necessary that all cells have the same transmission band as long as the bands for the synchronization channels are in the respective transmission bands.

Figure 11:
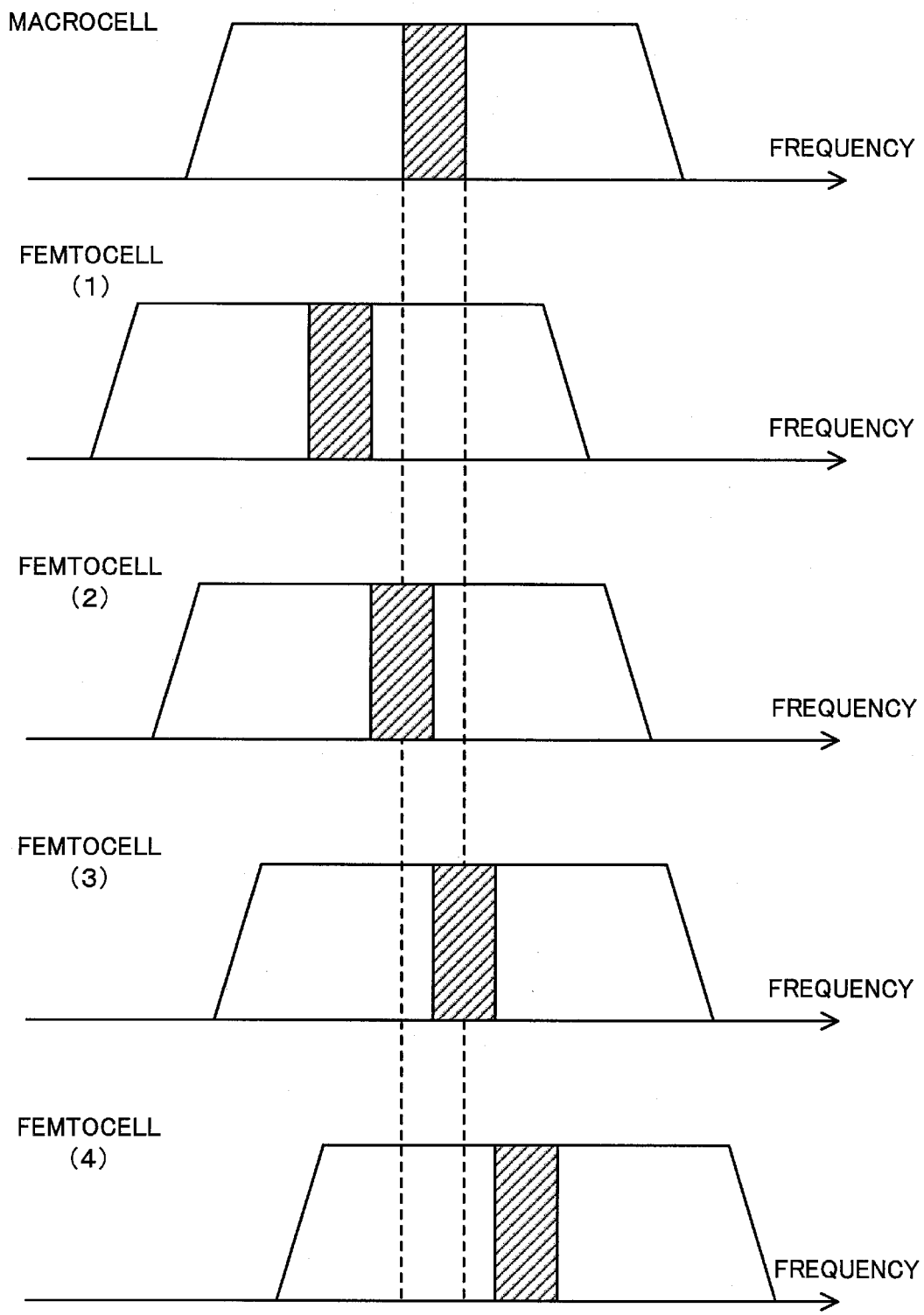
FIG. 11 is a fourth illustrating a relationship between synchronization channel and frequency.

FIG. 11 is a fourth view illustrating a relationship between synchronization channel and frequency. In this allocation example of FIG. 11, the synchronization channels of the macrocell and four femtocell groups are allocated the centers of their respective transmission bands. In this connection, the transmission band of each femtocell group is different from that of the macrocell and also from those of the other femtocell groups. Allocating transmission bands with a shift relative to each other in this way makes it possible to avoid using the same band for the synchronization channels among cells. This way can also offer flexible allocation of a transmission bandwidth to each cell.

According to the above-described cellular telephone system, it is possible to narrow down femtocells to be observed before the cell search even if lots of femtocells are provided and correspondences between femtocells and scrambling sequences are not recognized, thereby avoiding unnecessary detection of inaccessible femtocells. Thus, this system can provide a more efficient and faster cell search, and can realize a reduction in power consumption of mobile stations.

Further, as can be seen in the above-described cellular telephone system, providing lots of femtocells for supporting macrocells results in a reduction in the number of accesses to the macrocells, an improvement in communication quality, and a reduction in loads imposed on radio base stations and backbone networks. This may lead to a cost reduction in configuring a cellular telephone system and its operation.

As one embodiment, a cellular telephone system has been described by way of example. The above-described system is not limited thereto and may be easily applied to other radio communication systems. In addition, this embodiment uses a macrocell having sectors, but is not limited thereto.

The above-described transmission method can provide a transmission method, radio base station, and mobile station in a radio communication system which enables an efficient cell search in an environment where large cells and small cells coexist.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has(have) been described in detail, it should be understood that various changes, substitutions and alterations could be made hereto without departing from the spirit and scope of the invention.

What is claimed is:

1. A transmission method of transmitting a synchronization channel in a radio communication system where a first cell and a second cell are provided, the transmission method comprising:
    allocating the first cell to a first transmission band and allocating the second cell to a second transmission band that is different from the first transmission band and overlaps with the first transmission band;
    transmitting, in the first cell, a first synchronization channel by using a first partial band of the first transmission band, the first partial band being a central band of the first transmission band; and
    transmitting, in the second cell, a second synchronization channel by using a second partial band of the second transmission band, the second partial band being a central band of the second transmission band and different from the first partial band,
    wherein an area of the second cell is smaller than an area of the first cell,
    wherein the second transmission band of the second cell includes the first partial band used for transmitting the first synchronization channel, and
    wherein the first partial band and the second partial band partly overlap each other while a center frequency of the first partial band and a center frequency of the second band are different.

2. A radio base station of a second cell in a radio communication system where a first cell and the second cell are provided, the first cell is allocated to a first transmission band, the second cell is allocated to a second transmission band that is different from the first transmission band and overlaps with the first transmission band, and a first synchronization channel is transmitted in a first partial band of the first transmission band, the radio base station comprising:
    a transmitter configured to transmit a second synchronization channel in a second partial band of the second transmission band, the second partial band being a central band of the second transmission band and different from the first partial band,
    wherein an area of the second cell is smaller than an area of the first cell,
    wherein the first partial band used for transmitting the first synchronization channel is a central band of the first transmission band, and the second transmission band of the second cell includes the first partial band, and
    wherein the first partial band and the second partial band partly overlap each other while a center frequency of the first partial band and a center frequency of the second band are different.

3. A mobile station in a radio communication system where a first cell and a second cell are provided, the first cell is allocated to a first transmission band, the second cell is allocated to a second transmission band that is different from the first transmission band and overlaps with the first transmission band, and a first synchronization channel is transmitted in a first partial band of the first transmission band, the mobile station comprising:
    a controller configured to control bands used for detecting synchronization channels in a cell search, within the first partial band or, within the first partial band and a second partial band which is a central band of the second transmission band and used for transmitting a second synchronization channel in the second cell to which the mobile station is admitted to access,
    wherein an area of the second cell is smaller than an area of the first cell,
    wherein the first partial band used for transmitting the first synchronization channel is a central band of the first transmission band, and the second transmission band of the second cell includes the first partial band, and
    wherein the first partial band and the second partial band partly overlap each other while a center frequency of the first partial band and a center frequency of the second band are different.

4. A radio communication system comprising a first radio base station of a first cell, a second radio base station of a second cell, and a mobile station, wherein
    the first cell is allocated to a first transmission band, and the second cell is allocated to a second transmission band that is different from the first transmission band and overlaps with the first transmission band,
    the first radio base station comprises a transmitter configured to transmit a first synchronization channel in a first partial band of the first transmission band, the first partial band being a central band of the first transmission band,
    the second radio base station comprises a transmitter configured to transmit a second synchronization channel in a second partial band of the second transmission band, the second partial band being a central band of the second transmission band and different from the first partial band,
    an area of the second cell is smaller than an area of the first cell,
    the second transmission band of the second cell includes the first partial band used for transmitting the first synchronization channel, and
    the first partial band and the second partial band partly overlap each other while a center frequency of the first partial band and a center frequency of the second band are different.

5. The radio communication system according to claim 4, wherein the mobile station comprises a controller configured to search the first and second synchronization channels.

6. The radio communication system according to claim 5, wherein the controller controls bands used for detecting the first and second synchronization channels, within the first partial band or, within the first partial band and the second partial band.

* * * * *